United States Patent [19]

Mohun

[11] Patent Number: 5,178,761
[45] Date of Patent: Jan. 12, 1993

[54] POT WITH INTEGRAL STRAINER APPARATUS

[76] Inventor: Michael Mohun, 3157 Eccleston Ave., Walnut Creek, Calif. 94596

[21] Appl. No.: 834,434
[22] Filed: Feb. 13, 1992
[51] Int. Cl.⁵ .............. B01D 23/20; B01D 35/02; A47J 27/00; A47J 27/06
[52] U.S. Cl. .................... 210/469; 99/403; 126/369; 210/464; 220/912
[58] Field of Search ............... 99/403, 410, 413, 417, 99/495; 126/369; 220/912, DIG. 6; 210/464-469; D7/667

[56] References Cited

U.S. PATENT DOCUMENTS

| | | | |
|---|---|---|---|
| 1,053,780 | 2/1913 | Brooks | 210/469 |
| 1,225,047 | 5/1917 | Milligan | 210/469 |
| 1,259,183 | 3/1918 | Wildy | 210/469 |
| 1,317,066 | 9/1919 | Bebb | 210/469 |
| 1,750,158 | 3/1930 | Blakeman | 210/465 |
| 1,928,851 | 10/1933 | Devlin | 210/469 |
| 2,021,465 | 11/1935 | Ritscher | 99/413 |
| 2,466,347 | 4/1949 | Ziemianin, Sr. | 210/465 |
| 2,507,159 | 5/1950 | Holmgren et al. | 210/465 |
| 2,520,382 | 8/1950 | Conrad et al. | 210/465 |
| 4,220,534 | 9/1980 | Perry | 210/469 |

FOREIGN PATENT DOCUMENTS 543261 2/1957 Italy ................... 210/465

Primary Examiner—Timothy F. Simone
Attorney, Agent, or Firm—Townsend and Townsend

[57] ABSTRACT

A standard cooking pot is provided with an interior crescent shaped wall. The crescent shaped wall fastens to the inside surface of the pot and is sloped upwardly and away from the pot bottom from a radius of constant elevation on the generally cylindrical pot wall. The wall is aligned so that the two end of the crescent shaped wall fall on a diameter or chord across the pot parallel to the axis of the pot handle(s). At the juncture of the crescent shaped wall to the inside cylindrical pot wall at least one narrow interval is defined to permit drainage of cooking liquid along the pot wall and under the sloped crescent shaped wall. Preferably, the narrow interval is irregular—defining intermittent large and small apertures—so that total plugging of the aperture flow is unlikely to occur.

12 Claims, 2 Drawing Sheets

POT WITH INTEGRAL STRAINER APPARATUS

This invention relates to a pot for cooking contents eventually required to be strained and separated from the water in which the cooking occurs. Specifically, a pot is disclosed which includes an integral wall canted angularly upward from an inside cylindrical side wall of the pot with the wall defining one or more straining apertures between the wall and the inside cylindrical wall of the pot. Simple tipping of the pot produces separation of cooking liquid from cooked contents interior of the pot for the desired straining effect.

BACKGROUND OF THE INVENTION

Pots are commonly used to cook foods in a liquid—usually constituting water. When such cooking is either finished or has reached the end of a cooking stage, it is common to require the cooked contents interior of the pot to be drained of the cooking liquid. This is usually accomplished by one of three expedients.

In a first expedient, the contents of the pot are emptied to colander or strainer. The colander or strainer is a perforated vessel which receives the entire contents—food and cooking liquid—and allows the cooking liquid to be easily drained away. The operation of the use of the colander or strainer is simple—but does require the use of a separate and distinct vessel or other apparatus—the colander or strainer.

In a second expedient, the contents of the pot are poured directly against a lid placed over the pot. Typically, a small gap is preserved between the pot and the lid—and the cooked contents retained in the pot while the cooking liquid drains from the pot. This can be a satisfactory way to effect the separation of the cooked contents from the cooking liquid—but accidents frequently result. The cooking liquid is typically very hot. Steam and other heat makes its way to the top being held to partially plug the pot. Food can escape in the gap between the top and pot. Further, and where the top has an irregular sealing flange for mating to the pot, food can become stuck to the top and remain in the interface between the pot and top when the top is replaced on the pot. In short, straining the cooked contents within a pot from the cooking liquid is not a straightforward process.

In a third expedient, it has been proposed by a number of disclosures to utilize straining apparatus separate and apart from the pot, the separate apparatus being placed over the open mouth of the pot prior to tipping of the pot for drainage. Exemplary of such disclosures is Matthews U.S. Pat. No. 434,452; Marsha U.S. Pat. No. 1,196,570; Partridge U.S. Pat. No. 1,636,240; Blakeman U.S. Pat. No. 1,750,158; Ziemianin, Sr. U.S. Pat. No. 2,466,347; Schoenfeld U.S. Pat. No. 2,511,791; Holmgren U.S. Pat. No. 2,507,159; Conrad et al. U.S. Pat. 2,520,382.

SUMMARY OF THE INVENTION

A standard cooking pot is provided with an interior crescent shaped wall. The crescent shaped wall fastens integrally to the inside surface of the pot and is sloped upwardly and away from the pot bottom from a constant elevation on the inside cylindrical pot wall immediately adjacent the upper open end of the pot. The wall is aligned so that the two ends of the crescent shaped wall fall on a diameter or chord across the pot parallel to the axis of the pot handle(s). At the juncture of the crescent shaped wall to the inside cylindrical pot wall at least one narrow interval is defined to permit drainage of cooking liquid along the pot wall and under the sloped crescent shaped wall. Preferably, the narrow interval is irregular—defining intermittent large and small apertures—so that total plugging of the aperture flow by cooked contents interior of the pot is unlikely to occur. The wall has been found satisfactory with a total height from the cylindrical wall of the pot of as little of 1/5th of the diameter of the pot. During cooking, the shallow wall is completely passive, fitting under the pot lid without causing obstruction. When drainage of cooked contents is required, the lid can be completely removed and tipping of the pot with stacking of the pot content against the sloped crescent shaped wall enables simple drainage of cooking liquid from cooked contents.

BRIEF DESCRIPTION OF THE DRAWINGS

Other objects features and advantages of this invention will become more apparent after referring to the following specification and attached drawings in which.

DESCRIPTION OF THE PREFERRED EMBODIMENT

Figure 1:
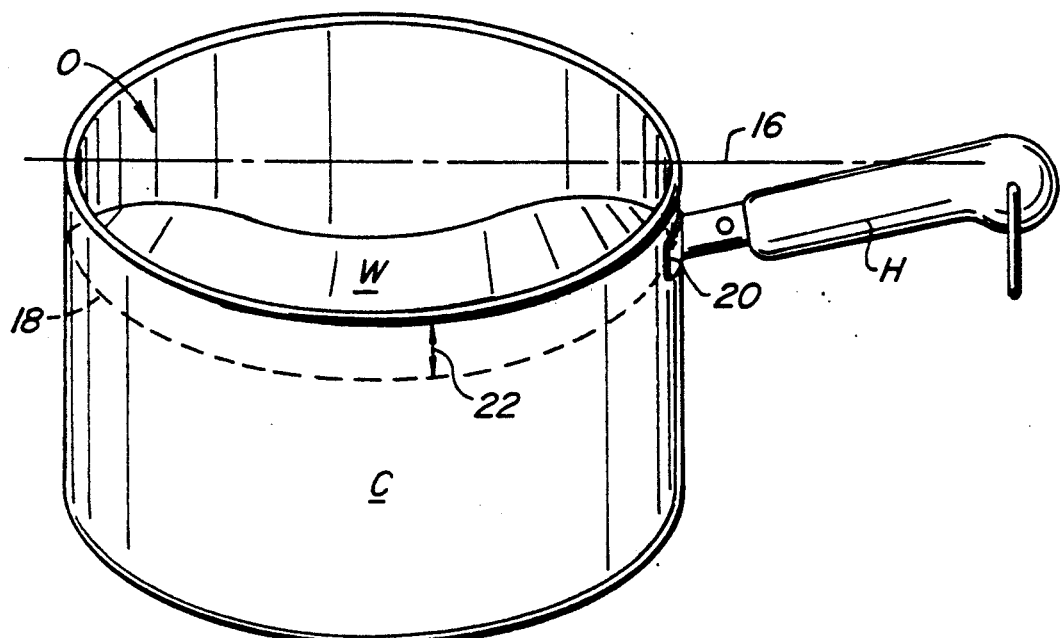
FIG. 1 is a perspective view of the pot of this invention shown in perspective so that the interior of the pot with the sloped crescent shaped wall can be plainly seen.

Referring to FIG. 1, a pot P manufactured by the Revere Ware Corporation of Clinton, Illinois and sold under the registered trade mark Revere Ware ® is illustrated. Pot P is a 3 quart saucepan having cylindrical walls C closed by a circular bottom B and defining a generally open top O. Pot P includes a handle H fastened to exterior cylindrical walls C at attachment point 20. The pot handle H is parallel to an axis 16 extending across the pot top.

The invention herein includes crescent shaped wall W. Wall W can best be understood by referring to FIGS. 1, 2, and 3 simultaneously. Referring to FIG. 1, wall W fastens to the inside of cylindrical walls C along a diameter 18 spaced downward of opening O at sufficient distance so as to not interfere with conventional top 30' (See FIG. 3—outline of top in broken lines) when the top is in place, typically during cooking.

The reader will understand that wall W could extend around the entire inner periphery of cylindrical walls C. In the preferred embodiment, I only include extension around a portion of the periphery—preferably 180°.

Figure 2:
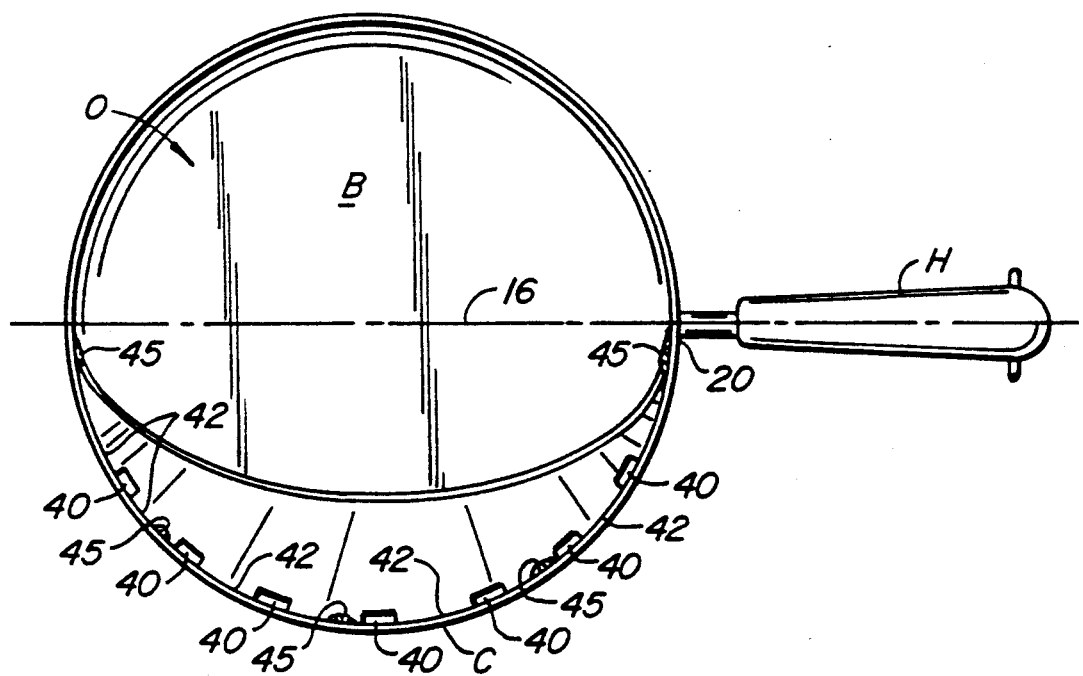
FIG. 2 is a top plan view of the pot looking along the cylindrical inside pot walls illustrating the preferred irregular attachment of the crescent shaped wall with respect to the inside pot wall and showing apertures through which the cooking liquid can be poured free from the cooked contents in the interior of the pot; and, FIG. 3 illustrates a side elevation section of the pot during pouring with the sloped crescent shaped wall holding back the pot contents while draining occurs, the view here showing a lid covering the open pot top in broken lines and positioned to act with the crescent shaped wall in solid lines to prevent the escape of the cooked contents within the pot.
Figure 3:
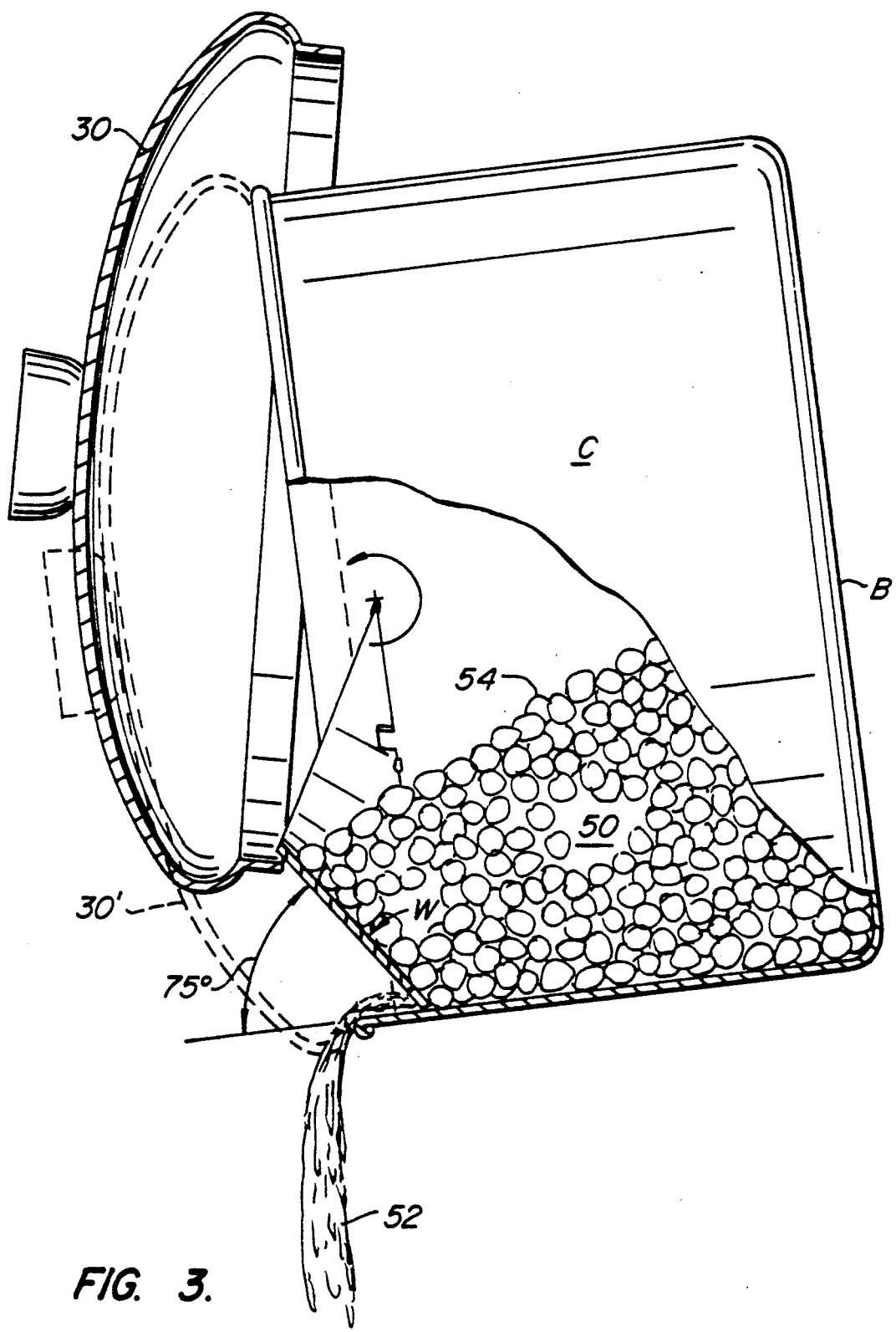

Further, and as can be seen in FIG. 2, wall W is "crescent shaped" when viewed in plan. The wall has its full height in the middle and tapers at either end to a terminating junction with the inside cylindrical walls C. Further, and as can be seen in FIG. 3, wall W forms a 75° angle with respect to the cylindrical sidewall of pot P and slopes away from bottom B.

It is required that pot P at wall W between the inside of cylindrical walls C and wall W form at least one aperture. The purpose of the aperture is to allow the cooked contents 54 stack against wall W when pot P is tipped while cooking liquid 52 drains free—as shown in FIG. 3.

In the preferred embodiment, a combination of apertures under wall W at cylindrical walls C are used. These include six large apertures 40 in combination with small apertures 42 extending therebetween. Fastening of wall W to the inside of pot P at five substantially evenly spaced welds 45 is here illustrated.

I show apertures only at the junction between wall W and cylindrical walls C. Apertures can be placed in wall W removed from the junction of cylindrical walls C—although this is not preferred.

It has been found that wall W need only be as high as about 1/5th the diameter of pot P. The cooked contents 54 normally have a tendency to stack against wall W with a less than flat slope and enable pot P to be tipped to an angle where drainage readily occurs.

Further, it will be seen in FIG. 3 that top 30 has been displaced and held in a position where the lower portion of lid 30 is adjacent the top portion of wall W. Although this represents a degree of over caution in the use of the instant invention, it is important to understand that top 30 can act together with wall W in this fashion where the cook wishes to make sure cooked contents do not flow from pot P.

The alignment of wall W with respect to handle H is important. Specifically, wall W is arrayed substantially parallel to axis 16 of handle H. This assures when handle H is rotated, wall W will be in the lower half of the pot in a position to otherwise obstruct the cooked contents from escape from the pot P while desired drainage occurs.

It will be understood that this invention can be utilized with all sizes and shapes of pots. For example, with pots having two opposite handles, wall W would be arrayed substantially parallel to an axis between the handles. Likewise, this invention will admit of other modifications.

What is claimed is:

1. In combination with a pot, said pot having, substantially cylindrical walls defining an open top; a closing substantially circular bottom, said circular bottom forming a fluid tight seal with respect to said cylindrical walls to enable said pot to hold contents to be cooked within a cooking fluid;
the improvement to said pot comprising:
a wall integrally fastened to said substantially cylindrical walls at a circumferential location on said cylindrical walls below said top of said pot;
said wall defining at said cylindrical walls of said pot at least one rectangular draining aperture directly adjacent said cylindrical wall whereby when said pot is tipped with said contents resting against said wall cooking liquid interior of said pot can drain free of cooked contents interior of said pot.

2. The invention of claim 1 and wherein:
said wall extends only partially around the inside circumference of said pot.

3. The invention of claim 1 and wherein:
said wall is sloped upwardly and away from said closing substantially circular bottom.

4. The invention of claim 1 and wherein:
said wall has a crescent shaped profile.

5. The invention of claim 1 and wherein:
said wall defines at said cylindrical walls of said pot a plurality of draining apertures.

6. The invention of claim 5 and wherein:
said plurality of draining apertures includes apertures of varying dimension defined between said cylindrical walls and said crescent shaped wall.

7. The invention of claim 2 and wherein:
said pot includes at least one handle protruding from a point of attachment on said cylindrical shaped walls for grasping said pot; and,
said wall is parallel at the two respective ends of said wall is parallel to a diameter taken through said cylindrical walls from the point of attachment of said handle whereby when said pot is tipped by grasping said pot with said handle, rotation of said handle tips cooked contents interior of said handle against said wall.

8. The invention of claim 1 and wherein said pot includes a lid for closing said open top; and,
said wall is recessed just below said open top of said pot to avoid interference with said lid.

9. A pot comprising:
substantially cylindrical walls defining an open top;
a closing substantially circular bottom, said circular bottom forming a fluid tight seal with respect to said cylindrical walls to enable said pot to hold contents to be cooked within a cooking fluid;
a handle fastened to said pot at a point of attachment to the exterior of said cylindrical walls of said pot;
a wall fastened to said substantially cylindrical walls at a circumferential location on said cylindrical walls below said top of said pot, said wall being substantially parallel to a diameter of said cylindrical walls taken from the point of attachment of said handle;
said wall sloped upwardly and away from said closing substantially circular bottom;
said wall defining at said cylindrical walls of said pot at least one rectangular draining aperture directly adjacent said cylindrical wall whereby when said pot is tipped with said contents resting against said wall, cooking liquid interior of said pot can drain free of cooked contents interior of said pot.

10. The invention of claim 9 and wherein said wall extends only partially around said inside of said cylindrical walls.

11. The invention of claim 9 and wherein said wall has a crescent shaped profile.

12. A pot comprising:
substantially cylindrical walls defining an open top;
a closing substantially circular bottom, said circular bottom forming a fluid tight seal with respect to said cylindrical walls to enable said pot to hold contents to be cooked within a cooking fluid;
a handle fastened to said pot at a point of attachment to the exterior of said cylindrical walls of said pot;
a crescent shaped wall fastened to said substantially cylindrical walls at a circumferential location on said cylindrical walls below said top of said pot, said crescent shaped wall being substantially parallel to a diameter of said cylindrical walls taken from the point of attachment of said handle;
said crescent shaped wall extending only partially around the inside circumference of said pot and sloped upwardly and away from said closing substantially circular bottom;

said crescent shaped wall defining at said cylindrical walls of aid pot at least one rectangular draining aperture directly adjacent said cylindrical wall whereby when said pot is tipped with said contents resting against said crescent shaped wall, cooking liquid interior of said pot can drain free of cooked contents interior of said pot.

* * * * *